United States Patent [19]

Mokrzycki

[11] 4,361,773
[45] Nov. 30, 1982

[54] COIL RETAINER AND TERMINAL ASSEMBLY

[75] Inventor: Eugene H. Mokrzycki, St. Paul, Minn.

[73] Assignee: Whirlpool Corporation, Benton Harbor, Mich.

[21] Appl. No.: 216,688

[22] Filed: Dec. 15, 1980

[51] Int. Cl.$^3$ .............................................. H02K 3/46
[52] U.S. Cl. ................................... 310/71; 339/217 S
[58] Field of Search ............ 310/71, 239; 339/217 S, 339/198 P, 198 S, 256 PS, 258 S

[56] References Cited

U.S. PATENT DOCUMENTS

| Re. 26,208 | 5/1967 | Tupper | 310/71 |
|---|---|---|---|
| 2,874,365 | 2/1959 | Woofter | 339/217 S |
| 3,065,448 | 11/1962 | Hopkins et al. | 339/217 S |
| 3,189,772 | 6/1965 | Wingler et al. | 310/162 |
| 3,226,585 | 12/1965 | Roe | 310/194 |
| 3,460,088 | 8/1969 | Arnao et al. | 339/217 S |
| 3,725,707 | 4/1973 | Leimbach et al. | 310/71 |
| 3,780,323 | 12/1973 | Swain | 310/43 |
| 4,003,128 | 1/1977 | Dochterman | 29/596 |
| 4,038,573 | 7/1977 | Hillyer et al. | 310/71 |
| 4,071,793 | 1/1978 | Cox | 310/71 |

OTHER PUBLICATIONS

Data Sheet, AMP Inc., No. 76-385 (Revised 8-77).

Primary Examiner—J. D. Miller
Assistant Examiner—D. L. Rebsch
Attorney, Agent, or Firm—Wegner, McCord, Wood & Dalton

[57] ABSTRACT

A coil retainer and terminal assembly for use in an electrodynamic device, such as an electric motor. The assembly includes a coil retainer having portions for retaining spaced portions of the motor coil in association with a core portion of the electrodynamic structure. The coil retainer further defines terminal support portions for receiving terminals to which connection portions of the coil are connected. The terminals, in the illustrated embodiment, further include connecting spade portions. The terminals are arranged to be slidably fitted to the coil retainer terminal support portions and cooperating locking structure is provided on the terminals and terminal support portions for locking the terminals in the installed disposition on the coil retainer. The locking structure, in the illustrated embodiment, includes a deflectible shoulder portion of the terminal arranged to have locking engagement with a transverse shoulder on the coil retainer in the installed disposition. The coil cooperates with the coil retainer in retaining the assembly in fixed association with the core, with the terminals mounted thereto in accessible disposition for facilitated connection of the coil connection portions thereto.

7 Claims, 6 Drawing Figures

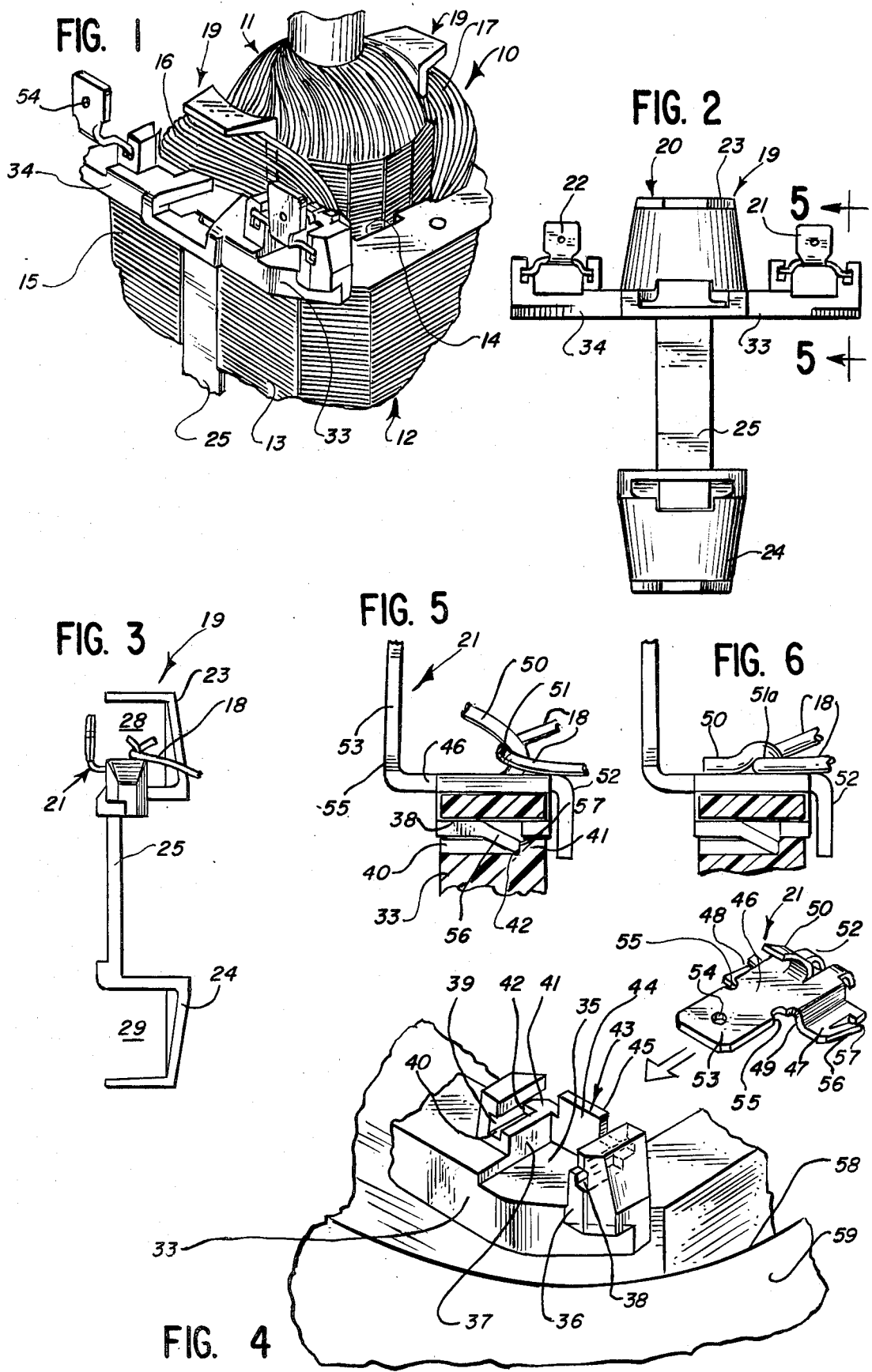

COIL RETAINER AND TERMINAL ASSEMBLY

BACKGROUND OF THE INVENTION

1. Field of the Invention

This invention relates to electrodynamic structures and in particular to means for supporting a coil to a core of an electrodynamic structure and having terminals carried thereby for connection of portions of the coil.

2. Description of the Background Art

In U.S. Pat. No. 4,071,793 of Dennis C. Cox, a field subassembly for electric motors is disclosed. As shown therein, the motor core is provided with an aperture between adjacent pole pieces of the core for use in connecting a pair of electrically insulating terminal blocks to the core. The blocks are arranged so that they do not extend either externally or internally of the core stack and are spaced from the core windings.

Michael J. Hillyer et al. show, in U.S. Pat. No. 4,038,573, a terminal board arranged to overlay the coil supporting board and provide supporting structure for multiple groups of terminals. The terminal board is retained in position by press fitting a boss on the underside of the terminal board into a mating hole in the supporting structure. The coils provide a second retention means. Terminals are mounted to the terminal board structure after it is installed on the core. The terminal receiving member defines a well into which the terminal is inserted.

Elverton O. Roe, in U.S. Pat. No. 3,226,585, shows a coil retaining means for use in an electric motor having end portions receiving opposite end portions of the coil. One of the ends of the coil is brought into a slot and is there electrically and mechanically connected to an insulated input wire as by crimping or soldering of the coil end to the input wire end. A covering insulating member is placed over the slots for insulating the connection.

In U.S. Pat. No. 3,725,707, Wendell B. Leimbach et al. show a field subassembly for a motor wherein a connector is insulatively mounted on the core of the motor to receive one end of the coil wire and provide for later connection to a stranded lead wire or other circuit element.

In U.S. Pat. No. 3,760,339, James W. Marshall shows a connector for a plug-in field wherein the terminal is insulatively mounted on the field core before winding the coils. The terminal includes a channel adapted to be crimped to the magnet wire at a socket adapted to receive the circuit element to which the magnet wire is to be connected.

In U.S. Pat. No. 4,003,128 of Richard W. Dochterman, a dynamoelectric machine termination arrangement is illustrated to include a molded insulation body partially covering the core. The termination arrangement includes a connection receiving and retaining portion of the insulation body, and an interconnected lead wire and coil lead. The interconnection is held in place by a wedging member so that the termination arrangement provides both strain relief and protective insulation for the interconnection.

SUMMARY OF THE INVENTION

The present invention comprehends an improved coil retainer and terminal assembly for use in electrodynamic structures, such as an electric motor.

More specifically, the invention comprehends the provision of such an improved assembly including a coil retainer having means for receiving portions of the coil associated with the electrodynamic structure core. The coil retainer is arranged to cooperate with the coil in maintaining both the coil retainer and coil in close fixed association with the core.

Terminal means are carried by the coil retainer and connection portions of the coil are connected to the terminal means for facilitated connection to other circuit components.

The terminal assembly more specifically includes a coil retainer having a terminal mounting portion defined by a base, sidewalls upstanding from the base in spaced relationship and having confronting inwardly facing parallel slots, and locking means, and a terminal having edge portions slidably received in the slots and shoulder means engaging the locking means as an incident of the terminal being installed on the terminal mounting portion to lock the terminal to the terminal mounting portion.

The shoulder means of the terminal may include a resiliently deflectible portion arranged to yieldably pass the locking means on the terminal mounting portion during sliding movement of the terminal to the installed position and to be disposed in locking association with the locking means in the installed position.

The locking means of the coil retainer, in the illustrated embodiment, defines a shoulder extending transversely to the longitudinal extent of the slots to be engaged by the deflectible portion in the installed position of the terminal to prevent withdrawal of the terminal from the slots, and an upstanding transverse wall.

The shoulder means, in the illustrated embodiment, further includes a turned tab engaging the terminal mounting portion in the installed disposition for preventing sliding movement of the edge portions in the slots past the installed position.

The coil retainer and terminal assembly of the present invention is extremely simple and economical of construction while yet providing the features discussed above.

BRIEF DESCRIPTION OF THE DRAWING

Other features and advantages of the invention will be apparent from the following description taken in connection with the accompanying drawing wherein:

FIG. 1 is a fragmentary perspective view of a portion of an electric motor structure having a coil retainer and terminal assembly embodying the invention;

FIG. 2 is a front elevation of the coil retainer and terminal assembly;

FIG. 3 is a side elevation thereof;

FIG. 4 is a fragmentary enlarged exploded perspective view illustrating the installation of the terminal on the terminal support portion of the coil retainer;

FIG. 5 is a fragmentary enlarged vertical section taken substantially along the line 5—5 of FIG. 2 illustrating in greater detail the locking of the terminal to the terminal support portion of the coil retainer and the connection of the coil wire end to the terminal; and FIG. 6 is a fragmentary enlarged view illustrating the connection of the coil wire end to the terminal after fusing has taken place.

DESCRIPTION OF THE PREFERRED EMBODIMENT

In the exemplary embodiment of the invention as disclosed in the drawing, an electrodynamic structure generally designated 10 comprises an electric motor having an armature 11, and a stator 12. The stator is defined by a laminated core 13 extending coaxially of the armature and defining an inner portion 14 and an outer portion 15. Electromagnetic insulated wire field coils 16 and 17 are provided in association with the core for generating magnetic flux therein. The present invention is concerned with means for retaining the coil in position on the core and providing means for connecting end connection portions 18 of the coil to other circuit elements.

More specifically, the invention comprehends an improved coil retainer and terminal assembly generally designated 19, as best seen in FIGS. 2 and 3 of the drawing. As shown, the assembly 19 defines a coil retainer 20 and a pair of terminals 21 and 22. The coil retainer defines an upper channel portion 23 and a lower channel portion 24 at the upper and lower ends of a connecting bar 25.

As seen in FIG. 3, channel portions 23 and 24 extend rearwardly from the ends of the connecting bar so as to define outwardly opening coil receiving spaces 28 and 29, respectively. The channel portions extend sufficiently rearwardly to be disposed inwardly of the inner portion 14 of core 13.

With the top channel portion 23 overlying the top of the core 13 and the lower channel portion 24 underlying the bottom of core 13, the coil may be formed inwardly of the core so as to have end portions received respectively in spaces 28 and 29. Thus, the coil and coil retainer cooperatively encircle a portion of the core so as to cooperatively retain the assembly 19 in close fixed association with the core.

As shown in FIG. 1, a pair of such coil and terminal retainer assemblies is utilized in the illustrated conventional motor at opposite sides of the core.

As indicated briefly above, the coil defines a pair of end connection portions 18. The invention comprehends further improved means for effecting connection of the respective connection portions to other motor circuit elements. For this purpose, the coil connection portions are electrically and mechanically connected to the terminals 21 and 22 one each. As seen in FIG. 2, the terminals 21 and 22 are carried on terminal support portions 33 and 34 extending laterally outwardly from the upper channel portion 23. Each of the terminal support portions and terminals are identical and, thus, the descriptions of terminal 21 and terminal support portion 33 applies equally to the terminal 22 and terminal support portion 34 assembly.

Thus, as best seen in FIG. 4, the terminal support, or mounting, portion 33 of the coil retainer defines a base 35 having a pair of upstanding sidewalls 36 and 37 in laterally spaced relationship and having confronting, inwardly facing, parallel slots 38 and 39, respectively. Each slot further defines a lowermost, upwardly opening recess 40 closed at its inner end by an upstanding wall portion 41 defining an outwardly facing shoulder 42.

As best seen in FIG. 4, extending transversely between sidewalls 36 and 37 at the inner end thereof is an upstanding wall 43 defining an outwardly facing shoulder 44 and an inwardly facing shoulder 45.

Terminal 21 comprises an electrically conductive metal element which may be formed from a flat metal sheet so as to define a midportion 46 and a pair of laterally outwardly projecting edge portions 47 and 48. The edge portions 47 and 48 are spaced below the plane of midportion 46 by a depending connecting portion 49 so as to dispose midportion 46 substantially at the top of the sidewalls while the edge portions 47 and 48 are slidably received in the slots 38 and 39 spaced below the upper end of the sidewalls.

The inner end of the terminal is provided with an upwardly turned wire connecting portion 50 to which the end 18 of the coil wire may be connected as at 51, as seen in FIG. 5, and to which the end 18 of the coil wire may be fused as at 51a, as seen in FIG. 6.

As further shown in FIG. 4, the inner end of the midportion 46 defines a pair of downturned tabs 52 at opposite sides of the wire connecting portion 50. The forward end of the terminal is defined by a spade 53 of conventional size and shape which may have an opening 54 provided therein as is customary. The spade 53 is adapted for providing a separable connection for the field coil 16 to connect it to test apparatus during motor manufacture and to associated electrical circuit elements during use of the motor. Recesses 55 may be provided at opposite sides of the terminal between spade 53 and midportion 46 to provide a weakened bendable portion of the terminal, permitting the spade to be turned to an upright position after the terminal is installed on the support portion 33, as seen in FIG. 5.

Each of edge portions 47 and 48 is provided with a resiliently deflectible tongue 56 defining at its rearward end a shoulder 57. The tongue is formed angularly downwardly from the edge portion so as to be disposed inwardly of shoulder 42 when the terminal is in the installed position of FIG. 5. The resiliency of tongue 56 permits the tongue to deflect upwardly as the terminal is being moved outwardly through slot 38 in the direction of the arrow in FIG. 4 in installing the terminal on the terminal mounting portion 33, and then as the rear edge of tongue 56 passes shoulder 42 the resiliency of tongue 56 causes it to snap below the edge of the shoulder 42, effectively locking the terminal against inward movement relative to the coil retainer.

The downturned tabs 52 limit the outward movement of the terminal to the installed disposition of FIG. 5 by engagement with the outer shoulder 45 of wall 43 which occurs substantially concurrently with the movement of shoulder 57 of tongues 56 into the recesses 40 so as to engage shoulder 42 of the wall portions 41. Thus, in the installed disposition of FIG. 5, the terminal is locked against inward and outward movement by the engagement of tongues 56 and tabs 52 with corresponding wall portions of the coil retainer mounting portions 33 and 34. As indicated above, the terminal is installed with the spade portion 53 extending coplanarly relative to midportion 46 and the spade portion is formed upwardly by a 90° bend to the final disposition of FIG. 5 after the terminal is installed.

Thus, as seen in FIG. 1, the terminals are installed at opposite sides of the upper portion of the coil retained in association with core 13 by the coil retainer. Thus, the end connections 18 of the coil wires may be readily brought to the terminals for facilitated electrical and mechanical connection thereof to the terminal portion 50, as shown in FIG. 5 for the initial connection prior to fusing, and as shown in FIG. 6 after fusing with the connecting portion 50 deformed and the end of the wire 18 fused to terminal 50 as indicated at 51a.

The disclosed coil retainer and terminal assembly is adapted for automatically winding the field coils 16 and 17. The field coils may advantageously be automatically wound with the coil retainer and terminal assembly 19 mounted in place on the stator core 12. One end of the wire for the field coil is first wound around connecting portion 50 of terminal 21 as shown in FIG. 5, then the field coil is completely wound by an automatic field coil winder (not shown), and then the other end of the wire for the field coil is connected around the connecting portion 50 of terminal 22 corresponding to terminal 21 as shown in FIG. 5. Then both end wires of the coil are fused at the same time to the terminals to provide fixed connections 51a (FIG. 6) between the terminal connecting portions 50 and the wire end coil connection portions 18 of the field coil.

The upstanding disposition of spade 53 of each of the terminals provides facilitated connection of either coil test equipment or associated elements of the motor circuitry.

The terminals may be readily installed in the terminal mounting portions of the coil retainer by the simple inward sliding movement thereof, as illustrated in FIG. 4. The coil retainer may be formed of low cost molded synthetic resin and, thus, the slots, recesses, and locking means defined by the transverse walls and shoulders of the mounting portions may be readily formed by suitable molding of the synthetic resin. Thus, the coil retainer and terminal assembly 19 is extremely simple and economical while yet providing improved facilitated winding and connection of the coils in the motor and mounting of the coils to the core 13.

The compact arrangement of the coil retainer and terminal assembly permits the motor to be installed through relatively small openings, such as motor opening 58 of a vacuum cleaner base 59.

The improved assembly 19 permits the use of automatic operations winding the field coils and in making the coil connections to the terminals in motor manufacture and, thus, provides for facilitated low cost construction of the motors. The terminals are arranged to provide for facilitated hot staking, or fusing, of the coil wire ends to the terminals for improved vibration-resistant mechanical connection of the wire ends thereto. Thus, the connections provide improved long trouble-free life in applications, such as vacuum cleaner motors where relatively high motor speed and vibration is present.

After the coils are secured to the core by the coil retainer and the wire connections are made to the terminals, the assembly may be tested through the electrical contact points defined by the terminals for facilitated quality control of the motor structure. Further, as the coil ends are secured to the terminals in the assembly, the subassembly may be readily handled without danger of damage to the wires and insulation thereon.

The location of the terminals is accurately controlled by the accurate formation of the coil retainer and the accurate positioning thereof on the coil retainer terminal mounting portions, as discussed above, for further improved facilitated testing and uniformity of motor construction.

The foregoing disclosure of specific embodiments is illustrative of the broad inventive concepts comprehended by the invention.

I claim:

1. In an electrodynamo structure having a field coil provided with connection portions, an improved coil retainer and terminal assembly adapted for automatic winding of said coil comprising:
a coil retainer having spaced channel portions for receiving portions of the field coil and a terminal mounting portion defined by a base, sidewalls upstanding from said base in spaced relationship and having confronting inwardly facing parallel slots, and locking means; and
a terminal having a midportion, edge portions slidably received in said slots, a pair of upturned portions including an upturned electrical connection spade and an upturned wire connecting portion on said midportion to which a connection portion of said field coil is electrically connected, and shoulder means engaging said locking means as an incident of said terminal being installed on said terminal mounting portion to lock said terminal to said terminal mounting portion, said shoulder means including a pair of resiliently deflectible portions each arranged to yieldably pass said locking means on the terminal mounting portion during sliding movement of said terminal to the installed position and to be disposed in locking association with said locking means in said installed position, said locking means defining a pair of shoulders extending transversely to the longitudinally extent of said slots to be engaged by said deflectible portions in the installed position of the terminal to prevent withdrawal of the terminal from said slots, said shoulder means further including a downturned tab engaging the terminal mounting portion in said installed disposition for preventing sliding movement of said edge portions in said slots past said installed position and cooperating with said cooperating locking means shoulder and deflectible terminal portion to releasably retain the terminal against displacement from the installed position, said terminal mounting portion defining an access opening providing access as by a deflecting tool to said deflectible portion permitting withdrawal of the terminal from said mounting portion when desired.

2. The electrodynamo structure of claim 1 wherein said coil has corresponding end portions received in said coil retainer end portions.

3. The electrodynamo structure of claim 1 wherein said coil and coil retainer cooperatively extend fully about a portion of the core.

4. The electrodynamo structure of claim 1 wherein said core defines an inner portion and an outer portion, said coil retainer extending outwardly of said outer portion and said coil extending inwardly of said inner portion and having spaced portions extending outwardly into retained association with said coil retainer.

5. The electrodynamo structure of claim 1 wherein each said terminal comprises a formed metal element having a locking portion secured to the terminal portion and a turned connecting portion for fixed electrical connection thereto of said coil connection portion.

6. The electrodynamo structure of claim 1 wherein said terminal mounting portions have a recessed portion for extension of said coil connection portions therethrough.

7. The electrodynamo structure of claim 1 wherein each said terminal comprises a formed metal element having a locking portion secured to the terminal mounting portion and a bendable portion defined by spaced recesses for providing a turned spade separable connecting portion upon mounting of the terminal means on the coil retainer.

* * * * *

UNITED STATES PATENT AND TRADEMARK OFFICE
CERTIFICATE OF CORRECTION

PATENT NO. : 4,361,773

DATED : November 30, 1982

INVENTOR(S) : EUGENE H. MOKRZYCKI

It is certified that error appears in the above-identified patent and that said Letters Patent are hereby corrected as shown below:

Column 6, line 22 (Claim 1, line 28), correct spelling of "longitudinally" to --longitudinal--;

Column 6, line 54 (Claim 5, line 3), after "terminal" insert --mounting--.

Signed and Sealed this

Twelfth Day of July 1983

[SEAL]

Attest:

GERALD J. MOSSINGHOFF

Attesting Officer

Commissioner of Patents and Trademarks